United States Patent Office 2,761,548
Patented Sept. 4, 1956

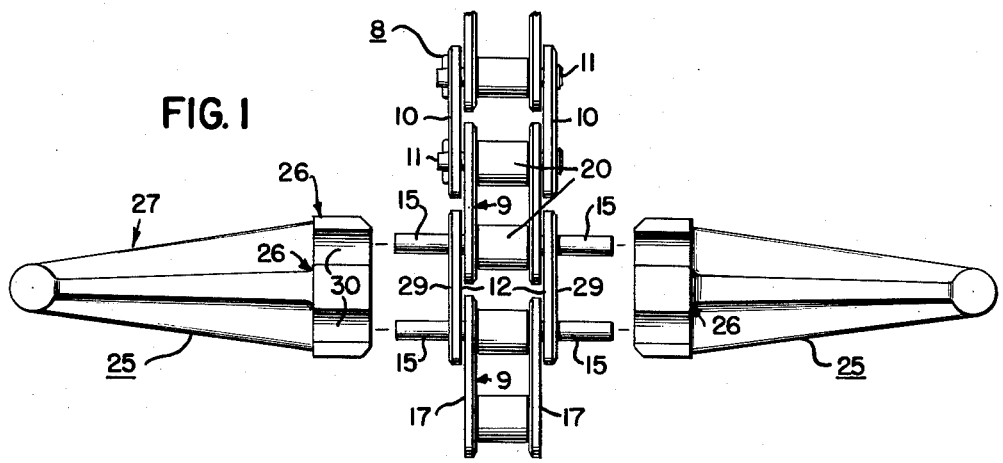
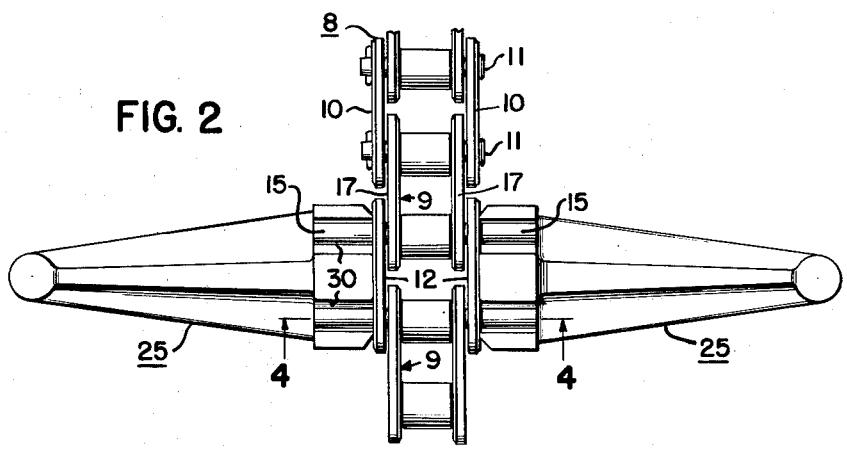
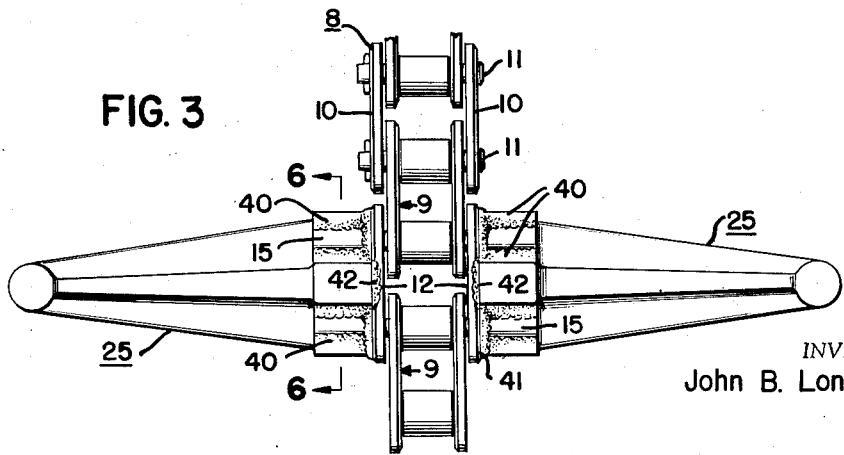

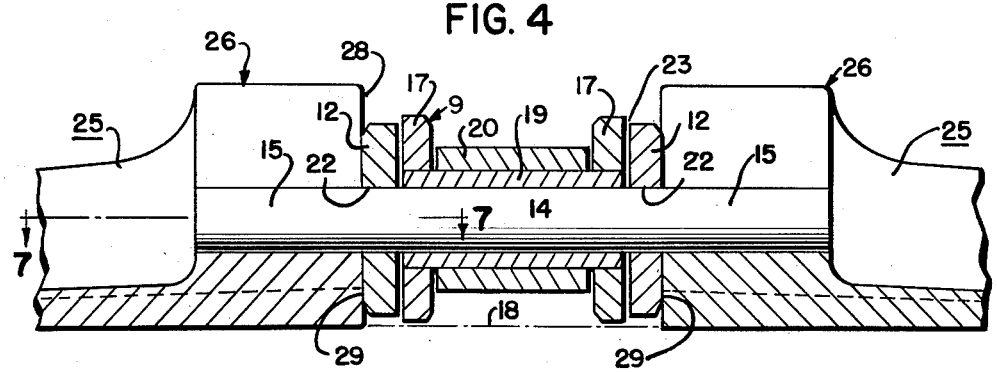
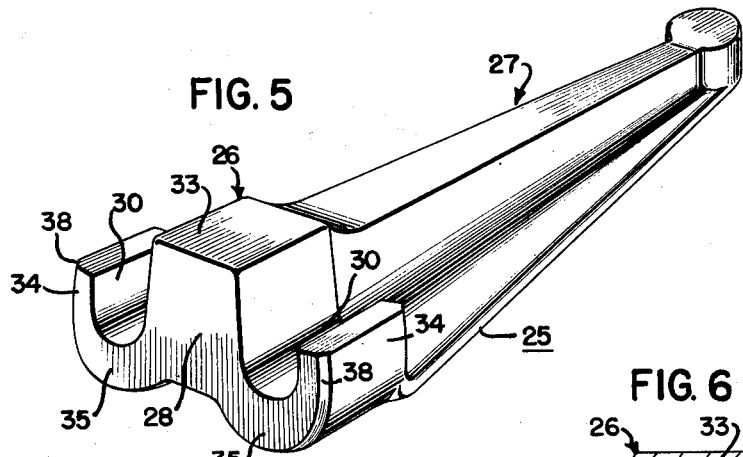
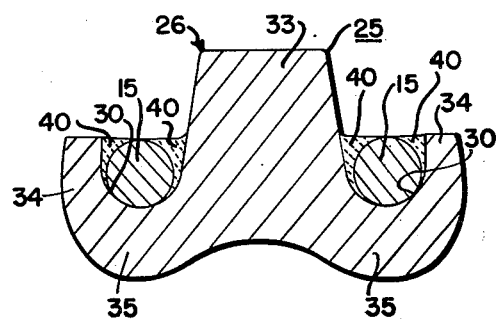
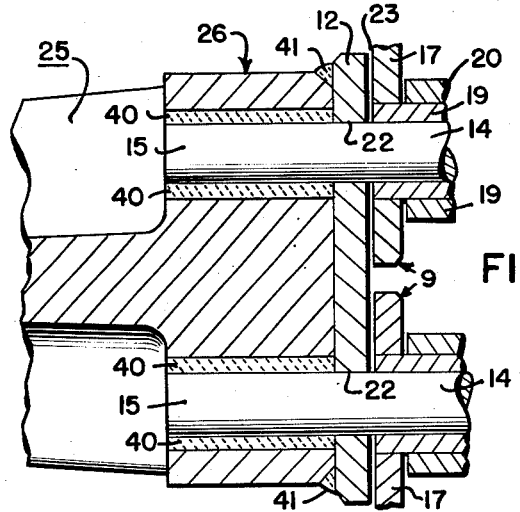

2,761,548

SCRAPER FLIGHT AND BUILT-UP CONVEYOR CHAIN AND FLIGHT COMBINATION

John B. Long, Oak Hill, W. Va., assignor to The Long Company, Oak Hill, W. Va., a corporation of West Virginia Application June 24, 1955, Serial No. 517,686

8 Claims. (Cl. 198—176)

This invention relates to power driven conveyors of the type in which endless chains, and scraper flights carried thereby, have runs above the bottoms of trough sections for moving loose material, such as broken coal, along the troughs.

The principal objects of the invention are to provide built-up conveyor chain and flight combinations which are simple in construction, and hence low in cost of manufacture, durable, and capable of easy assembly and repair.

Another object is to provide, as articles of manufacture, scraper flight elements, so shaped that they may be welded to previously assembled conveyor chains of the type, including spaced companion links or side bars, connecting pins and perhaps rollers, adapted for use with sprocket wheels, all of conventional construction, with the exception that a pair of connecting pins, longer than the conventional pins, are secured to the side bars of the chains through which they extend, wherever it is desired to secure the novel flights. In this way the flight is not used to take the place of a side bar of the chain. Relatively long conveyor chain sections may be manufactured and assembled at the factory and shipped to another point or points before the flights are applied. As a result, the attention to providing strong and durable chains may be had at the chain factory, where facilities for providing lateral clearance between adjacent side bars, shrink fitting of parts together, testing as to strength, etc., are available. Then comparatively unskilled labor may be used to accomplish the welding of the flights to the protruding portions of the longer chain or connecting pins, without the necessary or exercising care not to cause binding of chain sections together where such binding is not wanted, or is detrimental.

Another object is to provide, as articles of manufacture, scraper flights so shaped as to provide relatively long exposed surfaces longitudinally of the extended portions of the relatively longer connecting pins of the chain, when the flight is shoved or otherwise positioned with respect thereto, thus presenting considerable surface for the welding or bonding together of the flights and connecting pins.

Another object is to provide a built-up conveyor chain and flight combination which does not require any machining of the flights; when made of cast metal, in contradistinction to the considerable machining necessary where the flights are bolted to the chain structure as in the patents to Levin No. 1,770,650 and Ball No. 2,372,925, or function also as side bars for the chain as in the patent to Brown No. 1,683,653. This is in contradistinction also with any construction which requires pressed fits of the chain pins in holes of the flights.

A further object is to so form the flights that when secured to the extended portions of the longer connecting pins of the chain strand, the flights, when in use, will slightly elevate the chain from the conveyor trough bottom in the zone of the flights and thereby spread wear upon the conveyor trough bottom. The casing of the flight units so that the chain is thus elevated permits slight variations in castings without likelihood that the chain will hold the flights elevated from the bottom of the conveyor trough.

Other objects and advantages of the present invention will appear in the following detailed description of a highly successful embodiment of my invention, taken in connection with the accompanying drawings, forming a part of this specification, and in which drawings:

Fig. 1 is collective view in plan of a section of sprocket chain and scraper flights used in assembling the built-up conveyor chain and flight combination according to the preferred embodiment of my invention.

Fig. 2 is a similar plan view but with the elements shown in Fig. 1 moved to position for final conection of the same.

Fig. 3 is a plan view of the completed built-up conveyor chain and flight combination.

Fig. 4 is an enlarged sectional view on the line 4—4 of Fig. 2.

Fig. 5 is a perspective view of the scraper flight looking toward the attaching portion of the flight.

Fig. 6 is an enlarged sectional view on the line 6—6 of Fig. 3.

Fig. 7 is a fragmentary horizontal sectional view through a portion of the combination at substantially the zone of line 7—7 of Fig. 4.

In the drawing I disclose asprocket chain 8 differing but slightly from those commonly used as a part of power driven conveyors, and including inner links 9 and outer side bars 10 with parallelcross pins 11, the exception being that certain of the adjacent inner links 9 are connected together by side bars 12 and parallel transverse chain pins 14 which are longer than the pin 9 so as to have extended portions 15 projecting beyond outer faces 29 of the side bars 12, an appreciable distance, as clearly shown in Fig. 1.

The inner links, in the example shown, each comprise parallel side bars 17 connected at end portions by hub sleeves 19, adapted to pivot on the cross pins 11 and fixed to the side bars 17, and rollers 20 carried by the sleeves 19. It is of course understood that instead of using built-up inner links of the character described other types of links may be provided, such as "block links" not shown in the drawings.

The side bars 12 may be of the same size, shape and material as the side bars 10, but in many conventional chains, the side bars 10 are of less height than the height of the side bar 17 so that wear may come upon the latter where the rub upon the bottom of the trough, not shown in the drawing, but indicated by the dot and dash line 18 of Fig. 4.

It is preferred to fix the chain pins 14 to the side bars 12, such as by the procedure generally known as an interference or press fit when they extend through the usual holes 22 in the side bars. This assembly of the sprocket chain parts may well take place at the chain factory, where there are facilities for assuring the spaces 23 shown more particularly in Figs. 4 and 7, between the side bars 12 and 17, so that the inner links 9 will freely pivot on the cross pins 14.

The scraper flights 25 of novel formation, and preferably metal castings, each comprise a block-like attaching portion 26 and an integral scraper blade 27.

Referring first to the attaching portion 26, it has an end planar face 28, shown to a good advantage in Fig. 5 for engagement with the outer face 29 of the side bar 12, when the flight is in proper position with respect to the chain 8, as shown in Figs. 2 and 4. The attaching portion is provided with elongated parallel recesses 30 open to the top of the attaching portion, with their axes normal to the planar face 28, and spaced apart a distance, with respect to their axes, substantially equal to the spacing of the cross pins 14 at their axes, so that the cross pins nest in the recesses upon disposing the flight 25 in proper assembled relationship to the chain, as shown in Fig. 2.

The attaching portion 26 preferably includes a relatively high central body 33 and relatively low outside walls 34 connected to the body 33 by lower webs 35 which provide the bottoms of the recesses 30, the body 33 and walls 34 forming the sides of the recesses. In a manner the portions comprising the webs 35 and the walls 34 may be likened to hooks in which each web is the bight portion and the wall, the bill.

The attaching portion 26 is also preferably of a height greater than the height of any of the side bars 12 and 17, as shown in Fig. 4, and the webs 35 are of such depth that when the flight rests upon the trough bottom or other supporting surface indicated by the dot and dash line 18, and the extended portions 15 of the chain pins 14 are nested in the recesses 30, the planes of the lower portions of these side bars in the zone of the flight, elevating them in spaced relation to the trough bottom or supporting surface. Thus, in use, the wear is spread upon the conveyor trough bottom. It is also preferred that the attaching portion be of such dimension as to height that it extends above the plane of the upper portion of the side bars 12 and 17, as shown in Fig. 4. Thus the attaching portion provides a riding surface on any lower pan, not shown in the drawing, of the conveyor, during the return run of the conveyor chain.

The scraper blade 27 extends laterally from the side of the attaching portion 26 opposite to the side providing the planar face 28. This blade may be of any suitable shape, but in the example shown it is similar to the types of blades or scraper members shown in the aforesaid Patent No. 1,770,650 or in the patent to Petersen 1,699,335 which are suitable for use at either the right side or the left side of the conveyor chain, functioning to scrape and advance material regardless of the linear direction of movement of the chain.

If desired, the marginal portions of the walls 34 and portions of the webs 35 nearest the planar face may be beveled as at 38, Fig. 5, for a purpose to be subsequently set forth.

The flight is secured to the extended portions 15 of the chain pins 14 welds 40 extending along the pins and the walls of the recesses 30. If desired welds 41 shown in Fig. 7 may be provided, in the space provided by the bevels 38 and the side bar 12 to close any space which may exist between the planar surface and the side bar due to imperfections in casting of the flight or fault in not shoving the flight into intimate contact with the side bar during assembly. This welding may be continued along the top of the side bar and adjacent part of the attaching portion 26 as indicated by welds 42.

It has been found in practice that an assembly of the flights with respect to the sprocket chain 8 and the welding of the flights 25 in place may quickly be accomplished in this way:

The chain is laid out on a flat work table with the extended portions 15 of the pins 14 toward the operator in one case and away from him in the other. The flights, just prior to being placed with respect to the extended portions of the chain pins are placed in a gas-fired, open-front heating furnace, and brought to a temperature of from 500° to 700° F. When the heated flights are shoved or otherwise placed in proper position with respect to the extended portions of the chain pins, the operator proceeds to weld in a straight line longitudinally of the pin, in the zone where the pin and flight body are in close proximity. If desired the welding may be continued across the pin and the adjoining portion of the chain side bar, as shown in Fig. 3, but such is not absolutely necessary, but desirable when the conveyor chain and flights are large, heavy and subjected to large and heavy loads, as when incorporated in mechanical coal loaders or mining machines, or where imperfect flights are encountered, as previously described.

The pre-heating of the flights serves to eliminate the possibility of cracks in the weld which may otherwise be occasioned by a metal quench, such as would be possible if cold parts were welded together. The temperature of from 500° to 700° F., in a casting having the mass of the flights, tends to allow the welded assembly to cool slow enough so as to prohibit the occurrence of cracks.

I claim:

1. A built-up sprocket chain conveyor section comprising a plurality of side bars and a plurality of transverse chain pins connecting the side bars, a pair of said chain pins extending beyond the outer face of at least one of the side bars, a scraper flight including an attaching portion, abutting the outer face of said last mentioned side bar, and provided with upwardly opening recesses in which said extending portions of said pair of chain pins are nested, and welds extending along said last mentioned pins and the walls of said recesses, securing the scraper flight to the said pins.

2. The combination of claim 1 in which said pair of chain pins are rigid with their respective side bar.

3. The combination of claim 1 in which said attaching portion of the flight is of a height greater than the height of said last mentioned side bar and extends above the plane of the upper portion thereof.

4. The combination of claim 1 in which said attaching portion of the flight is of a height greater than the height of said last mentioned side bar and extends below the plane of the lower portion thereof.

5. The combination of claim 1 in which said attaching portion is of a height greater than the height of said last mentioned side bar and extends above and below the planes of the upper and lower portions, respectively, thereof.

6. The combination of claim 1 in which said attaching portion has an upright planar face engaging the outer face of said last mentioned side bar, and welds connecting said attaching portion to the latter extend along margins of said planar face.

7. As an article of manufacture, a flight of the scraper type adapted to be disposed laterally of and carried by a strand of link conveyor chain of the type including spaced parallel chain pins rigid with and extending outwardly beyond a side bar of the chain, said flight comprising a block-like attaching portion provided with an end planar bearing face for engagement with the outer face of the chain side bar and elongated parallel recesses open to the top of the attaching portion, with their axes normal to said planar face and spaced apart a distance for nesting of the extended portions of the chain pins therein, and a scraper blade rigid with said block-like attaching portion and extending laterally therefrom at a side thereof opposite to said planar face.

8. A flight as specified in claim 7 in which said attaching portion includes a relatively high central body and relatively low outside walls to each side thereof, said central body and walls forming the sides of said recesses.

References Cited in the file of this patent

UNITED STATES PATENTS 2,657,787     Long et al. _____ Nov. 3, 1953

FOREIGN PATENTS 838,122     Germany _____ May 5, 1952